United States Patent

[11] 3,622,886

[72] Inventor Gerald Rabow
Nutley, N.J.
[21] Appl. No. 762,453
[22] Filed Sept. 25, 1968
[45] Patented Nov. 23, 1971
[73] Assignee International Telephone and Telegraph Corporation
Nutley, N.J.

[54] SYNCHRONIZATION SYSTEM
10 Claims, 2 Drawing Figs.

[52] U.S. Cl. .......... 325/321
[51] Int. Cl. .......... H04j 3/06
[50] Field of Search .......... 325/58, 63, 321, 323; 178/69.5

[56] References Cited

UNITED STATES PATENTS

| | | | |
|---|---|---|---|
| 3,028,487 | 4/1962 | Losee | 178/69.5 |
| 3,057,959 | 10/1962 | Rowe | 178/69.5 |
| 3,069,504 | 12/1962 | Kanero | 178/69.5 |
| 3,453,592 | 7/1969 | Ishii et al. | 178/69.5 |

*Primary Examiner*—Robert L. Griffin
*Assistant Examiner*—Anthony H. Handrel
*Attorneys*—C. Cornell Remsen, Jr., Walter J. Baum, Percy P. Lantzy, Philip M. Bolton, Isidore Togut and Charles L. Johnson, Jr.

ABSTRACT: In an early-late gate type synchronization system, a code generator driven by a voltage controlled clock produces a predetermined code signal. This signal is employed to generate a delayed version thereof and a gate signal at the transitions of the undelayed code signal. The predetermined code signal is also received from a remote transmitter by a first balanced modulator having a delayed code signal coupled to its other input to recover the received code signal. A second balanced modulator receives the received code signal on one input and the undelayed code signal on its other input. The output of the second modulator is gated by an AND gate enabled by the gate signal. The output signal of the first balanced modulator and the AND gate are coupled to a phase detector to produce a control signal operable on the clock to synchronize the delayed code signal with the received code signal.

INVENTOR
GERALD RABOW
BY Alfred C. Hill
AGENT

INVENTOR
GERALD RABOW
BY Alfred C. Hill
AGENT

SYNCHRONIZATION SYSTEM

BACKGROUND OF THE INVENTION

This invention relates to coded communication systems and more particularly to a code synchronization system of the early-late gate type utilized with such code communication systems.

Communication systems employing coded communication signals, or where at least a portion of the communication signals are coded, have utility in a variety of applications. For example, such applications are as follows: (1) protection from interferring signals; (2) for optimum combining of several portions of a signal suffering different propagation delays; (3) in systems wherein it is desired to reduce the probability of an unauthorized receiver from establishing proper timing to thereby enable receiving communication not intended therefore; (4) multiple access systems, remote control systems and supervisory control systems wherein a plurality of stations each have a different address code known to the transmitter or control signal so that the code signal will activate control circuitry to ready the receiver to receive messages intended therefore, or control and supervisory signals intended therefore; (5) in systems where a remote station is interrogated by an address code and there is received from the remote station telemeter information, such as pressure, temperature and the like; and other systems which fall in or are related to these general applications.

For proper utilization of these coded systems, it is necessary to generate a code at the receiver identical to the code being received and to operate on the receiver components to keep the locally generated code in proper time alignment with respect to the received code.

The efficiency of the systems employed in the various applications are enhanced and optimum results are achieved when a pseudo-random type binary code signals are employed for coding the communication signals, either the complete communication signal, or just the address code of the communication system.

One conventional method for achieving the desired receiver synchronization is referred to as the "early-late gate" technique. Conventional synchronization systems using this type of technique requires three signal channels, an early channel, a signal channel, and a late channel. The signal channel is the main channel and the local code applied to it is to be adjusted for optimum alignment with the received code. The local code applied to the early channel is advanced with respect to the code applied to the signal channel by a time T while the code applied to the late channel is delayed with respect to the code applied to the signal channel by time T. One effect of incorrect code alignment is a decrease in signal channel output relative to that obtained with optimum alignment by an amount which depends on T. By taking the difference of the output signals of the early and late channels and controlling the local code generator so as to null this difference, the early and late codes locally generated are constrained to be equally offset from the incoming signals and, hence, the local code applied to the signal channel is aligned with the incoming signal. One big advantage of the early-late gate technique is that the signal reaching the main signal channel is not disturbed in order to maintain synchronization. Disadvantages of the early-late gate technique are the requirement of three separate channels, as well as tight tolerances on the relative gain of the early and late channels in order to keep the null point accurate.

SUMMARY OF THE INVENTION

An object of the present invention is to provide an improved "early-late gate" technique to achieve synchronization of the locally generated code with the received code.

Another object of the present invention is to provide a synchronization system employing early-late gate techniques which eliminate most of the disadvantages of the conventional prior art early-late gate technique without affecting the advantages thereof.

Still another object of the present invention is to provide a synchronization system employing an early-late gate technique having only two channels.

A further object of the present invention is to provide a synchronization system employing an improved early-late gate technique having only two channels which does not require identical or tight tolerances on the relative gain for the two channels.

A feature of the present invention is to provide an early-late gate type synchronization system wherein there is obtained a difference waveform between the incoming code signal operated on by the advanced code and the incoming signal operated on by the delayed code. This difference signal is amplified, filtered and phase sensitivity detected and the coder phase is adjusted so as to null this detected output.

Another feature of the present invention is the provision of a code synchronization system comprising a source of at least a predetermined code signal; first means to generate a first code signal and a second code signal time displaced with respect to the first code signal, each of the first and second code signals being identical to the predetermined code signal; a single signal channel coupled to the source and the first means responsive to the predetermined code signal and the second code signal to recover the predetermined code signal; and a single control channel coupled to the source the first means and the signal channel responsive to the first code signal, the predetermined code signal, and the recovered predetermined code signal to generate a control signal to adjust the timing of the first and second code signals to time align the second code signal with the predetermined code signal and thereby establish the desired synchronization.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENT

Figure 1:
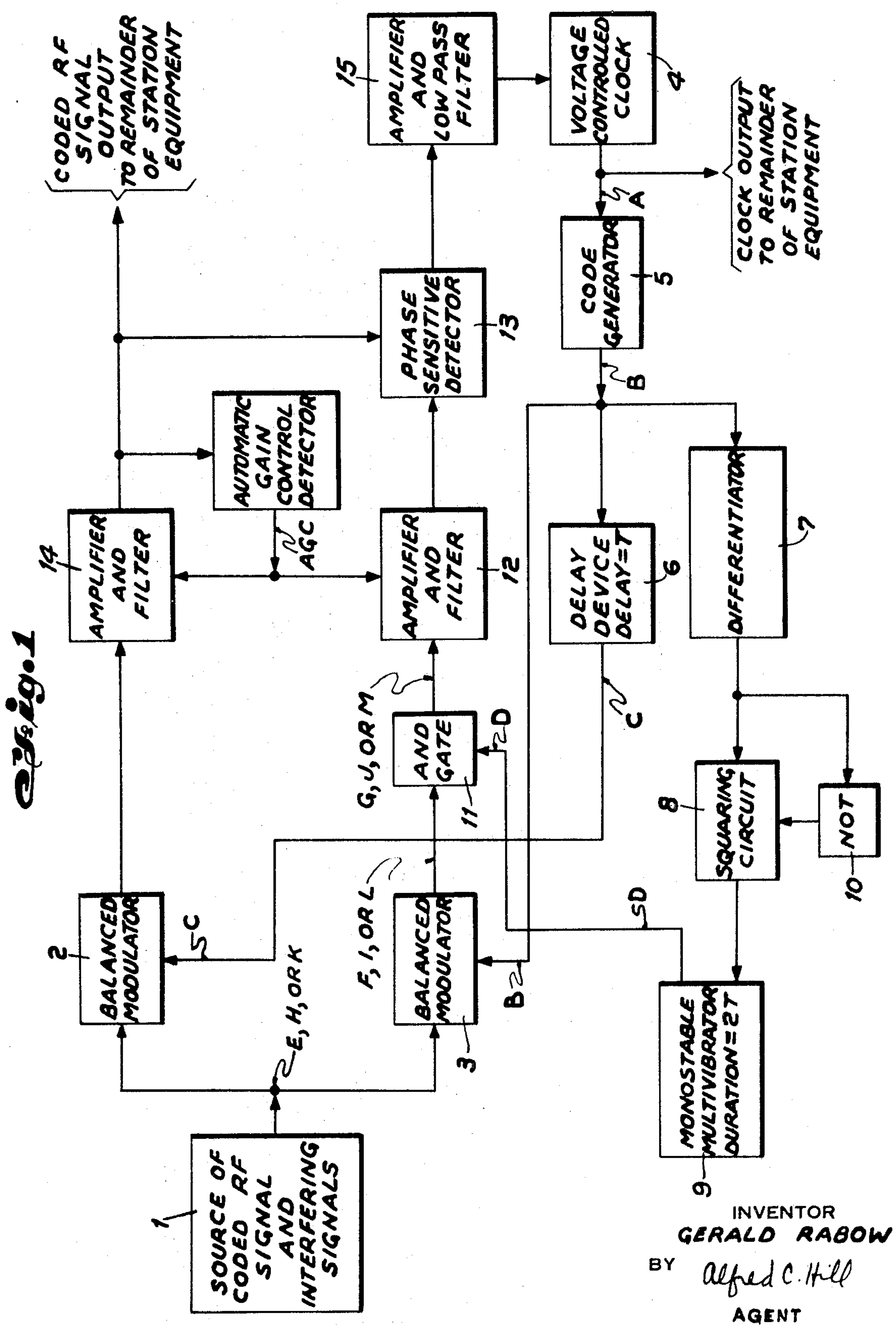
FIG. 1 is a block diagram of the synchronization system according to the principles of the present invention.

In the following description of the drawing, for purposes of explanation, the received code signal and the locally generated identical code signals will be considered to be pseudo-random binary coded signals and the coding and decoding processes consist of reversing carrier phase whenever the state of the code changes.

Figure 2:
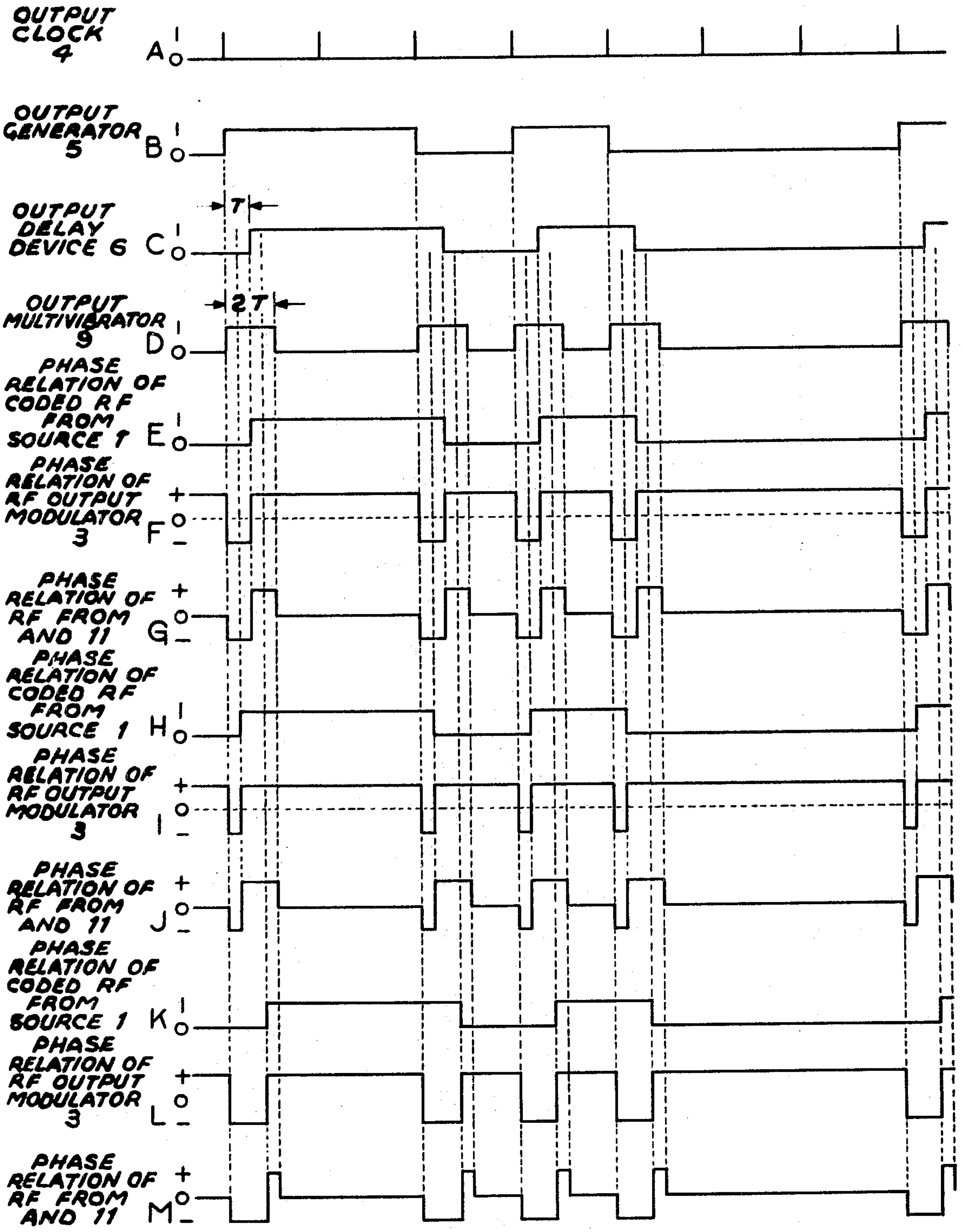
FIG. 2 is a timing diagram useful in explaining and illustrating the operation of the synchronization system of FIG. 1.

The block diagram of FIG. 1 incorporates therein at the input and output of certain of the components lettered references which refer to the lettered identification of the curves of FIG. 2.

Referring to FIG. 1, the coded RF signal from source 1 is considered to be immersed in an interferring signal and is coupled to a main signal channel including balanced modulator 2 and a lower or code generator phase control channel including balanced modulator 3. In the main signal channel, the incoming RF signal from source 1 is or is not phase reversed in balanced modulator 2 depending on whether the local code signal applied to this balanced modulator has a phase relationship the same as the phase relationship of the received RF signal, or an opposite phase relationship with respect to the received RF signal. The lower or code generator phase control channel including modulator 3 utilizes the difference between the received signal multiplied by the advanced local code signal and the received signal multiplied by the delayed local code signal. As will be explained hereinbelow, this difference can be obtained without explicitly performing this operation.

Source 1, which may include a distant transmitter, a propagation path and receiver front end, is applied to the input of the synchronization system of this invention. The received predetermined code signal from source 1 may be time coincident with the delayed locally generated code signal as illustrated by comparing Curves C and E, FIG. 2, advanced with respect to the delayed code signal as illustrated by comparing Curves C and H, FIG. 2, or delayed with respect to the delayed code signal as illustrated by comparing Curves C and K, FIG. 2.

A local code generator and gate signal generator is illustrated in FIG. 1 as including voltage controlled oscillator 4 which couples its output to the remainder of the station equipment and also to code generator 5 to produce the undelayed locally generated code signal. This locally generated code signal as illustrated in Curve B, FIG. 2 is identical to the code of the signal received from source 1. Code generator 5 may be a shift register with appropriate feedback between the stages thereof to provide the pseudo-random binary code signal which is identical to the received psuedo-random binary code signal. The output of generator 5 is coupled to delay device 6 to produce the locally generated delayed code signal as illustrated in Curve C, FIG. 2. The output of generator 5 is also coupled to an arrangement to produce a gate signal whose leading edge is time coincident with the transitions of the code signal output of generator 5. Such an arrangement may include differentiator 7 which will provide a positive spike for the positive going transitions of the undelayed code signal and negative spikes for the negative going undelayed signal. The output from differentiator 7 is coupled to squaring circuit 8 which is constructed to operate only on positive going spikes to provide a square pulse for triggering of multivibrator 9 of the monostable type. To produce the gate signal at the negative going transitions of the undelayed coded signal, some arrangement must be provided to invert the negative spikes produced by differentiator 7 due to the negative going transitions of the undelayed code signals. One way of accomplishing this is to provide NOT-gate 10 to provide the inverted negative spikes for operation on by circuit 8 to produce the triggering pulses for multivibrator 9 at both transitions of the undelayed code signal. The delay in device 6 is equal to T while the monostable multivibrator 9 produces a gate pulse output having a duration of 2T.

The delayed code signal output of device 6 is coupled to modulator 2 to recover the predetermined code signal from source 1. The undelayed code signal from generator 5 is coupled to modulator 3 and produces an output for coupling to AND-gate 11 which is enabled by the gate signal output of multivibrator 9 as illustrated in Curve D, FIG. 2. The gated output of AND-gate 11 is then amplified and filtered in amplifier and filter 12 prior to application to phase sensitive detector 13. Detector 13 has its other input coupled to modulator 2 through amplifier and filter 14 whose output is the coded signal output coupled to the remainder of the station equipment and also provides the reference signal for detector 13. The output of detector 13 is coupled through amplifier and low pass filter 15 to produce a control voltage which is operable on clock 4 to provide synchronization between the delayed code signal from device 6 and the code signal received from source 1 by providing time coincidence between these two codes. The control signal from filter 15 controls the rate or speed of clock 4 which drives generator 5 in such a way as to produce a null and, hence, the desired synchronization.

The operation of the synchronization system of FIG. 1 can be readily described with reference to the Curves of FIG. 2. Assume for the present that the phase relation of the coded RF from source 1 is in time synchronization with the delayed code signal provided by device 6. This is illustrated in Curves C and E, FIG. 2. The phase relation of the RF signal output of modulator 2 is averaged by filter 14 and applied to detector 13 as a reference signal. The phase relation of the RF signal output of modulator 3 is illustrated in Curve F, FIG. 2. Curve F is produced by the output of generator 5 (Curve B) combined with the output of source 1 (Curve E) having a negative phase relation due to Curves B and E being opposite in polarity during the delay interval time T and positive polarity, since the phases are the same, after the transition of the received RF code. When AND-gate 11 is enabled by the gate signal (Curve D, FIG. 2) and the other input is Curve F, FIG. 2, there is produced at the output of AND-gate 11 the waveform illustrated in Curve G, FIG. 2. The output of AND-gate 11 is averaged by filter 12 and is coupled to detector 13 along with the output from filter 14. Detector 13 converts the RF phase relation at the output of filter 12 to a control voltage substantially as illustrated in Curve G, FIG. 2. It will be observed that the positive and negative portions of this waveform are equal in duration and amplitude and this results in a zero control voltage at the output filter 15 for application to clock 4. This is the desirable null control signal for clock 4, since the system is actually synchronized.

Now let us assume that the phase relation of the coded RF signal from source 1 leads the delayed coded signal from device 6 as illustrated by comparing Curves C and H, FIG. 2. The phase relation of the RF output signal from modulator 2 after being averaged in filter 14 is again the reference signal for detector 13. The phase relation of the RF output signal of modulator 3 is illustrated in Curve I, FIG. 2. Here again, the negative phase relationship is obtained due to the opposite phase relationship between Curves B and H, FIG. 2. The RF output signal of modulator 3 is gated by AND-gate 11 when enabled by the gate signal of Curve D, FIG. 2 and results in the phase relation of the RF signal from AND-gate 11 as illustrated in Curve J, FIG. 2. This output is averaged by filter 12 and is coupled to detector 13 along with the output of filter 14. Detector 13 converts the RF phase relation at the output of filter 12 to a control voltage substantially as illustrated in Curve J, FIG. 2. It will be observed in Curve J, FIG. 2, that the positive portion has a wider duration than the negative portion of this waveform thereby resulting in a positive control signal, after being amplified and filtered in amplifier and filter 15, which controls clock 4 to regain synchronization.

Similarly, if the phase relation of the coded RF signal from source 1 is in a lagging relationship with the delayed coded signal from device 6 as illustrated by comparing Curves C and K, FIG. 2, there is a negative control voltage produced to properly control clock 4 to regain synchronization. The RF signal from modulator 2 is again averaged by filter 14 and is applied to detector 13 as a reference signal. The phase relation of the output RF signal from modulator 3 as illustrated in Curve L, FIG. 2 which is applied to AND-gate 11 to produce the output when enabled by the gate signal (Curve D, FIG. 2) having the phase relation as illustrated in Curve M, FIG. 2. The output from AND-gate 11 is averaged in filter 12 and is coupled to detector 13 together with the output from filter 14. Detector 13 converts the RF phase relation at the output of filter 12 to control voltage substantially as illustrated in Curve M, FIG. 2. It will be observed in this curve that the negative portion of the waveform has a wider duration than the positive portion thereby resulting in the required negative control signal at the output of amplifier and filter 15 to properly control clock 4 to regain synchronization.

It should be noted that an interferring signal will have little effect on the error control loop, since the phase of this interference signal at the output of AND-gate 11 will be equally probably positive or negative and, thereby cancel one another when applied to detector 13.

While I have described above the principles of my invention in connection with specific apparatus, it is to be clearly understood that this description is made only by way of example and not as a limitation to the scope of my invention as set forth in the objects thereof and in the accompanying claims.

I claim:

1. A code synchronizing system comprising:

a source of at least a predetermined binary code signal having a first amplitude equal to binary "1," a second amplitude different from said first amplitude equal to binary "0" and transitions between said first and second amplitudes;

first means to generate a first code signal and a second code signal time displaced with respect to said first code signal, each of said first and second code signals being identical to said predetermined binary code signal;

a signal detector means coupled to said source and said first means responsive to said predetermined binary code signal and said second code signal to recover said predetermined code signal; and control means coupled to said source, said first means, and said signal detector means responsive to said first binary code signal, said predetermined code signal, and said recovered predetermined binary code signal to generate a control signal and to couple said control signal to said first means to adjust the timing of said first and second code signals to time align said second code signal with said predetermined binary code signal and thereby establish the desired synchronization.

2. A system according to claim 1, wherein said control means includes a balanced modulator coupled to said course and said first means responsive to said predetermined code signal and said first code signal; and said control signal is a difference waveform derived from said recovered predetermined code signal and a selected portion of the output signal of said balanced modulator.

3. A system according to claim 1, wherein said predetermined code signal and said first and second code signals are identical pseudo-random binary code signals.

4. A system according to claim 1, further including second means coupled to said first means to generate a gate signal at said transitions of said first code signal; and said control means is further responsive to said gate signal.

5. A system according to claim 4, wherein said first means includes a voltage controlled clock coupled to said control means, a code generator coupled to said clock to generate said first code signal, and delay means coupled to said generator to generate said second code signal.

6. A system according to claim 4, wherein said signal detector means includes a balanced modulator coupled to said source and said first means.

7. A system according to claim 4, wherein said control means includes a balanced modulator coupled to said source and said first means responsive to said first code signal and said predetermined code signal, an AND gate coupled to the output of said balance modulator and said second means responsive to said gate signal and the output signal of said balanced modulator, phase detector means coupled to the output of said AND gate and said signal detector means responsive to said recovered predetermined code signal and the output signal of said AND gate to produce said control signal, and filter means coupled to the output of said phase detector means to couple said control signal to said first means to adjust the timing of said first and second code signals.

8. A system according to claim 4, wherein said first means includes a voltage controlled clock, a code generator coupled to said clock to generate said first code signal, and delay means coupled to said generator to generate said second code signal;

said signal detector means a first balanced modulator coupled to said source and said delay means; and said control means includes a second balanced modulator coupled to said source and said generator, an AND gate coupled to the output of said second balanced modulator and said second means, phase detector means coupled to the output of said AND gate and the output of said first balanced modulator to produce said control signal, and filter means coupled to the output of said phase detector means to couple said control signal to said clock to adjust the timing of said first and second code signal to establish said desired synchronization.

9. A system according to claim 4, wherein said source provides said predetermined code signal immersed in an interferring signal; and said predetermined code signal and said first and second code signals are identical pseudo-random binary code signals.

10. A system according to claim 9, wherein said first means includes a voltage controlled clock, a code generator coupled to said clock to generate said first code signal, and delay means coupled to said generator to generate said second code signal;

said signal detector means includes a first balanced modulator coupled to said source and said delay means; and said control means includes a second balanced modulator coupled to said source and said generator, an AND gate coupled to the output of said second balanced modulator and said second means, phase detector means coupled to the output of said AND gate and the output of said first balanced modulator to produce said control signal, and filter means coupled to the output of said phase detector means to couple said control signal to said clock to adjust the timing of said first and second code signal to establish said desired synchronization.

* * * * *